May 28, 1963 J. TELLERMAN ETAL 3,091,737

COMPUTER SYNCHRONIZING CIRCUIT

Filed June 13, 1960

INVENTORS.
JACOB TELLERMAN
ALBERT ZARETSKY
BY
Raymond A. Paquin
ATTORNEY.

3,091,737
Patented May 28, 1963

3,091,737

COMPUTER SYNCHRONIZING CIRCUIT

Jacob Tellerman, Bayside, and Albert Zaretsky, Brooklyn, N.Y., assignors to American Bosch Arma Corporation, a corporation of New York Filed June 13, 1960, Ser. No. 35,567
6 Claims. (Cl. 328—72)

The present invention relates to digital computers and has particular reference to a circuit for providing periodic retiming during computer operation.

In digital computers using synchronized D.C. logic, long logic chains can introduce time delays which will result in improper operation unless periodic retiming of information pulses is effected. In general, the present invention relies on the coincidence of a clock pulse and an information pulse to cause a capacitor to be charged to the information pulse level. Upon cessation of the clock pulse the capacitor is discharged through the utilization circuit, thereby applying the information pulse to the utilization circuit at the end of the clock pulse. This arrangement provides means for synchronizing the information to the lagging edge of the clock pulse thereby imposing a one digit delay in the output signal. In a particular embodiment of the present invention the retiming or synchronization circuit also incorporates logic circuits as well as the one digit delay for extended utility. In this preferred embodiment, the return to the supply potential in a pair of ordinary AND circuits are returned to the computer clock pulse source (or a similarly synchronized source) rather than to the constant D.C. voltage. The AND circuit outputs are connected to an OR circuit, the output of which is adapted to supply an input pulse to a utilization circuit such as a flip-flop for example.

Interposed between the flip-flop input and the OR circuit is a network which contains a pair of diodes connected serially between the flip-flop input and the reference potential terminal (e.g., ground), a capacitor connected between the OR output and the junction of the diode pair, and a third diode connected between the OR output and the clock synchronized pulse source. The polarity of the diodes is observed so as to accomplish a charging of the capacitor upon existence of an OR circuit output and a discharge of the capacitor through the flip-flop input at the end of the clock synchronized pulse. In this way the flip-flop is triggered at the lagging edge of the clock pulse which is actually the beginning of the next digit time thereby providing the one digit delay.

For a more complete understanding of this invention, reference may be had to the accompanying diagrams in which.

Figure 1:
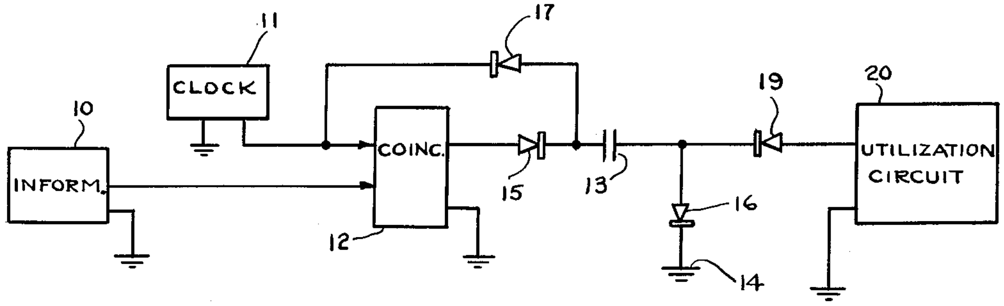
FIGURE 1 illustrates the invention in a general way.

The concept behind the invention is illustrated in FIGURE 1 in which the voltage pulse from an information source 10 and a voltage pulse from clock 11 are applied to a coincidence circuit 12 which produces an output pulse only when both inputs are energized. The capacitor 13 being in the circuit between the output of the coincidence circuit and the common or reference bus 14 through the properly polarized diodes 15, 16 becomes charged to the output pulse level. As soon as the clock pulse becomes zero the capacitor 13 discharges through the circuit which includes diode 17, clock pulse source 11, common lead 14, utilization circuit 20, which may be the trigger input of a flip-flop for example and diode 19. The capacitor 13 will discharge only when the clock pulse goes to zero. If the information pulse becomes zero before the clock pulse becomes zero the diode 17 is still biased to its high impedance state by the clock output. As soon as the clock pulse becomes zero, the zero potential between that input to the circuit 12 and the common bus complete the discharge circuit for capacitor 13. Thus, the trigger flip-flop of circuit 20 is actuated at the trailing edge of the clock pulse.

Figure 2:
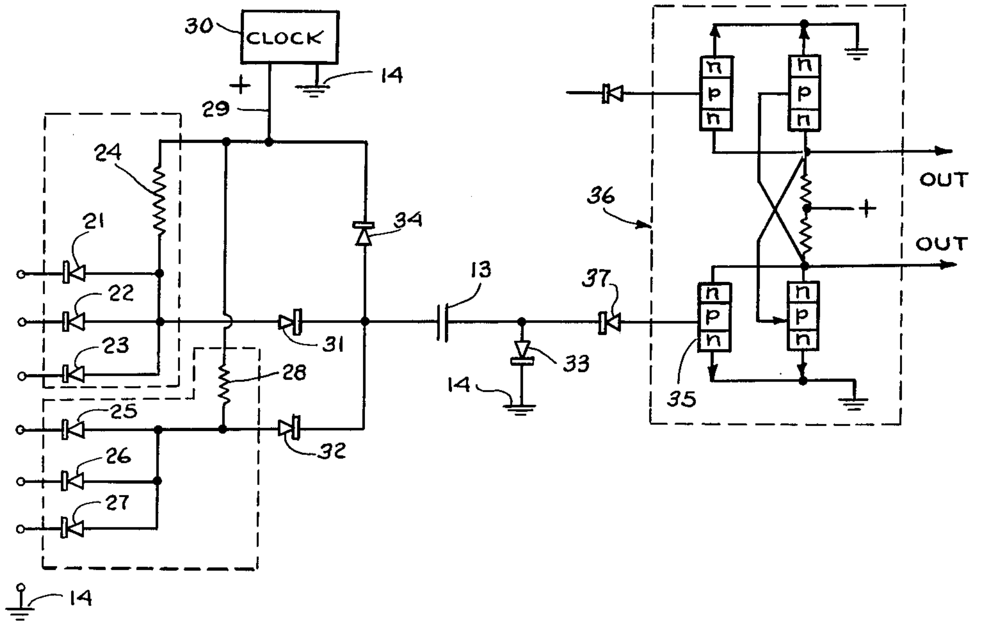
FIGURE 2 illustrates the invention applied in particularly advantageous computer circuitry.

Referring now to FIGURE 2 of the drawings, a preferred embodiment of the invention is shown. Diodes 21, 22, 23 with resistor 24 and diodes 25, 26, 27 with resistor 28 represent conventional three input AND circuits. However, the resistors 24 and 28 which are usually connected to a constant unidirectional source are, in FIGURE 2, connected to terminal 29 of the clock pulse source 30. Other sources may be employed providing that their output pulses occur simultaneously with the clock pulses which control the entire computer of which FIGURE 2 is only a small part. The polarity of the diodes is consistent with the polarity of the information pulses in the computer. FIGURE 2 shows a circuit in which the information pulses are positive going pulses. If any one of the inputs to diodes 21, 22, 23 is zero, the clock pulse will be inhibited as that diode maintains a low (zero) voltage at the AND circuit output, i.e., between the junction of the diodes 21, 22, 23 and the reference or common conductor 14 indicated by a grounding symbol. When the inputs to each of the diodes 21, 22, 23 is raised to the positive value of the information pulse, the output of the AND circuit is also raised to that level in accordance with well known operating characteristics of the circuit.

An output from either or both of the two AND circuits causes the capacitor 13 to become charged by means of the circuit which is completed between the output of the AND circuits diode 31 or 32 respectively, capacitor 13 diode 33 and the common lead 14.

As soon as the clock pulse at terminal 29 returns to zero, the AND circuit output also reduces to zero since the low impedance path between the AND inputs and output is destroyed. The capacitor 13 having become charged as previously described, is now discharged through a circuit which may be traced through diode 34 terminal 29 clock pulse source 30 common lead 14 n-p-n transistor 35 of the flip-flop circuit 36 and diode 37. The resulting change in the base current of the transistor 35 is sufficient to cause a change in the conduction thereof as required for flip-flop operation.

The flip-flop circuit 36 shown is standard and no significance should be attached to its use in illustrating the preferred embodiment of FIGURE 2. This particular flip-flop is found illustrated in "Digital Computer Components and Circuits," authored by R. K. Richards, D. Van Nostrand, 1957 edition, page 169.

Summarizing again, the invention contemplates charging of a capacitor in the presence of an information pulse coincident with the clock pulse, and discharging the capacitor through a utilization device as soon as the clock pulse reduces to zero. The circuit for accomplishing this action is included between the AND circuits and the flip-flop 36.

We claim:

1. In a computer synchronizing circuit, a coincidence circuit including a plurality of input terminals, an output terminal and a reference terminal, a plurality of non-linear elements, said input terminals severally connected to one side of each of said non-linear elements, the other side of said non-linear elements connected to said output terminal, a source of synchronizing clock pulses connected between said output terminal and said reference terminal, a source of information pulses connected to each of said input terminals, a capacitor, a first diode connected between said output terminal and one side of said capacitor, a second diode connected between the other side of said capacitor and said reference terminal, the polarity of said diodes permitting charging of said capacitor by the output of said coincidence circuit, a third diode connected between said one side of said capacitor and said clock pulse source, a load connected to said reference terminal, a fourth diode connected between said load and said other side of said capacitor, the polarity of said third and fourth diodes permitting discharge of said capacitor through said load.

2. In a computer synchronizing circuit, a coincidence circuit including at least one input terminal, an output terminal and a reference terminal, a non-linear element connected between each input terminal and said output terminal, a source of synchronizing clock pulses connected between said output terminal and said reference terminal, a source of information pulses connected to each of said input terminals, a capacitor, a first diode connected between said output terminal and one side of said capacitor, a second diode connected between the other side of said capacitor and said reference terminal, the polarity of said diodes permitting charging of said capacitor by the output of said coincidence circuit, a third diode connected between said one side of said capacitor and said clock pulse source, a load connected to said reference terminal, a fourth diode connected between said load and said other side of said capacitor, the polarity of said third and fourth diodes permitting discharge of said capacitor through said load.

3. In a computer synchronizing circuit, a coincidence circuit including a plurality of input terminals, an output terminal and a reference terminal, a plurality of non-linear elements, said input terminals severally connected to one side of each of said non-linear elements, the other side of said non-linear elements connected to said output terminal, a source of synchronizing clock pulses connected between said output terminal and said reference terminal, a source of information pulses connected to each of said input terminals, a capacitor, a first diode connected between said output terminal and one side of said capacitor, a second diode connected between the other side of said capacitor and said reference terminal, the polarity of said diodes permitting charging of said capacitor by the output of said coincidence circuit, a third diode connected between said one side of said capacitor and said clock pulse source, a load connected to said reference terminal, a fourth diode connected between said load and said other side of said capacitor, the polarity of said third and fourth diodes permitting discharge of said capacitor through said load, whereby said capacitor is charged upon simultaneous presence of information pulses at each input terminal and a clock pulse, and said capacitor is discharged in the absence of a clock pulse.

4. In a computer synchronizing circuit, a coincidence circuit including at least one input terminal, an output terminal and a reference terminal, a non-linear element connected between each input terminal and said output terminal, a source of synchronizing clock pulses connected between said output terminal and said reference terminal, a source of information pulses connected to each of said input terminals, a capacitor, a first diode connected between said output terminal and one side of said capacitor, a second diode connected between the other side of said capacitor and said reference terminal, the polarity of said diodes permitting charging of said capacitor by the output of said coincidence circuit, a third diode connected between said one side of said capacitor and said clock pulse source, a load connected to said reference terminal, a fourth diode connected between said load and said capacitor, the polarity of said third and fourth diodes permitting discharge of said capacitor through said load, whereby said other side of said capacitor is charged upon simultanous presence of information pulses at each input terminal and a clock pulse, and said capacitor is discharged in the absence of a clock pulse.

5. In a computer synchronizing circuit, a coincidence circuit including a plurality of input terminals, an output terminal and a reference terminal, a plurality of non-linear elements, said input terminals severally connected to one side of each of said non-linear elements, the other side of said non-linear elements connected to said output terminal, a source of synchronizing clock pulses connected between said output terminal and said reference terminal, a source of information pulses connected to each of said input terminals, a capacitor, a first diode connected between said output terminal and one side of said capacitor, a second diode connected between the other side of said capacitor and said reference terminal, the polarity of said diodes permitting charging of said capacitor by the output of said coincidence circuit, a third diode connected between said one side of said capacitor and said clock pulse source, a load connected to said reference terminal, a fourth diode connected between said load and said other side of said capacitor, the polarity of said third and fourth diodes permitting discharge of said capacitor through said load, a second coincidence circuit similar to said coincidence circuit and having an output terminal connected to said clock pulse source, a diode connected between the output terminal of said second coincidence circuit and said capacitor.

6. In a computer synchronizing circuit, a coincidence circuit including at least one input terminal, an output terminal and a reference terminal, a non-linear element connected between each input terminal and said output terminal, a source of synchronizing clock pulses connected between said output terminal and said reference terminal, a source of information pulses connected to each of said input terminals, a capacitor, a first diode connected between said output terminal and one side of said capacitor, a second diode connected between the other side of said capacitor and said reference terminal, the polarity of said diodes permitting charging of said capacitor by the output of said coincidence circuit, a third diode connected between said one side of said capacitor and said clock pulse source, a load connected to said reference terminal, a fourth diode connected between said load and said other side of said capacitor, the polarity of said third and fourth diodes permitting discharge of said capacitor through said load, a second coincidence circuit similar to said coincidence circuit and having an output terminal connected to said clock pulse source, a diode connected between the output terminal of said second coincidence circuit and said capacitor.

References Cited in the file of this patent

UNITED STATES PATENTS

| | | |
|---|---|---|
| 2,923,817 | Wanlass | Feb. 2, 1960 |
| 2,943,264 | Anderson | June 28, 1960 |